United States Patent [19]
Parker et al.

[11] Patent Number: 5,466,420
[45] Date of Patent: Nov. 14, 1995

[54] AIR BAG INFLATOR

[75] Inventors: Todd S. Parker, Centerville; Brian T. Snyder, Hooper; Brian H. Fulmer, Farr West, all of Utah

[73] Assignee: Morton International, Inc., Chicago, Ill.

[21] Appl. No.: 280,486

[22] Filed: Jul. 26, 1994

[51] Int. Cl.$^6$ ................................................ B60R 21/16
[52] U.S. Cl. ........................ 422/164; 422/165; 280/736; 280/740; 280/742
[58] Field of Search ...................... 422/164, 165, 422/166, 167, 305; 280/736, 740, 742

[56] References Cited

U.S. PATENT DOCUMENTS 4,865,635  9/1989  Cuevas .
4,902,036  2/1990  Zander et al. ........................ 280/736
5,064,459  11/1991 Unterforsthuber et al. .

*Primary Examiner*—Timothy M. McMahon
*Attorney, Agent, or Firm*—Philip C. Peterson; Henry W. Tarring, II; Gerald K. White

[57] ABSTRACT

An air bag inflator for inflating an air bag includes a housing for generating gas having only two walled chambers, including a centrally disposed ignition chamber and an outer chamber in coaxial relation therewith. The outer chamber provides a dual function of containing a quantity of gas generating material in an inner portion thereof and holding a filter for cooling and collecting contaminants from the generated gas in an outer portion thereof. The filter is mounted with an inlet face of substantial area in direct contact with and surrounding a body of gas generating material and no wall is provided between the filter and the generating material.

20 Claims, 3 Drawing Sheets

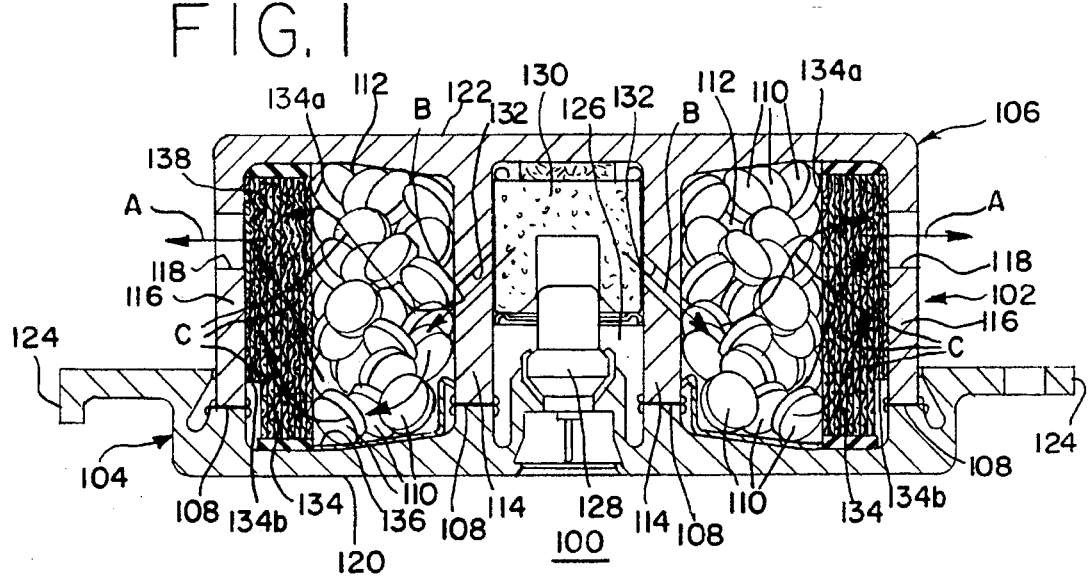
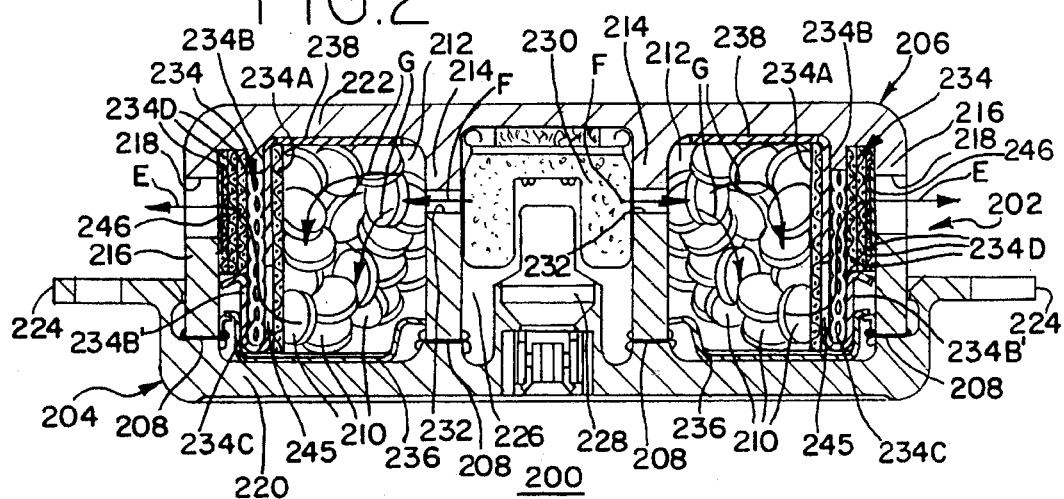

5,466,420

AIR BAG INFLATOR

BACKGROUND OF THE INVENTION

1. Field of the Invention

The present invention relates to air bag inflators and more particularly to a new and improved housing for an air bag inflator having only a single ignition wall therein and eliminating the need or requirement for a combustion wall commonly used to separate gas generating material from a filter in the inflator.

2. Background of the Prior Art

Typical prior art air bag inflators used on the driver's side or steering wheels of motor vehicles have a housing or canister with three distinct chambers inside an outer side wall thereof. In general, there is a housing wall between the ignition system and the gas generating material and another wall between the gas generating material and a filter. The gas produced in the inflator must flow through ports in both walls before passing out through diffusion ports in the outermost wall of the housing into an air bag. As the gas passes through the relatively small ports in the inside wall, the gas flow is turned a number of times to help slow down the gas flow and improve the filtering action.

OBJECTS OF THE INVENTION

It is an object of the present invention to provide a new and improved air bag inflator and more particularly a new and improved housing for an air bag inflator.

Another object of the present invention is to provide a new and improved air bag inflator housing which eliminates the need for three separate and distinct chambers inside the inflator.

Another object of the present invention is to provide a new and improved air bag inflator housing having only two separated chambers, one for an ignition system and another for containing both a gas generant material and a filter.

Yet another object of the present invention is to provide a new and improved air bag inflator housing which eliminates the need for a ported combustion wall between gas generating material and a filter.

Yet another object of the present invention is to provide a new and improved air bag inflator housing which reduces or eliminates high velocity gas jets which might cause burn holes or burned areas in a filter contained in the housing.

Still another object of the present invention is to provide a new and improved air bag inflator housing wherein a wall between gas generant material and a filter is eliminated altogether so that direct contact is provided between the gas generant material and the filter over a substantially large area.

Yet another object of the present invention is to provide a new and improved air bag inflator of the character described which utilizes a filter of much smaller volume yet maintains high efficiency filtering and cooling characteristics.

Still another object of the present invention is to provide a new and improved air bag inflator of the character described which is much smaller in size and requires less total volume to contain the combustion generant material to inflate an air bag.

Still another object of the present invention is to provide a new and improved air bag inflator of the character described which requires a minimal volume filter and a maximum volume of gas generant material yet which still provides rapid and highly efficient inflation of an air bag when activated.

Another object of the invention is to provide a new and improved air bag inflator and housing of the character described which is low in cost, efficient in operation, easier to assemble and less complex in wall construction so that the flow of gas generated is diffused over a larger area across a filter and moves at lower velocity resulting in cleaner and cooler air bag inflation operation.

BRIEF SUMMARY OF THE PRESENT INVENTION

The foregoing and other objects and advantages of the present invention are accomplished in a new and improved air bag inflator for activation to rapidly inflate an associated air bag. The inflator includes a canister or housing having an outer peripheral side wall with a plurality of spaced apart diffuser ports for directing generated gas outwardly to rapidly inflate the air bag. The housing has a top wall and a spaced apart bottom wall joined respectively to opposite end portions of the outer side wall. The housing has only one interior side wall for containing an ignition system which directs hot ignition gases outwardly into a surrounding chamber in the housing. The outer chamber has no separate internal walls yet provide a dual function of containing a quantity of gas generating material in an inner portion and filter in an outer portion. The need for a ported combustion wall normally used to separate the gas generation material from the filter is eliminated. The surrounding filter is in direct contact with the gas generating material offering a relatively large inlet side to provide a greater flow cross-section which is immediately available for the gas flow resulting in better diffusion of the gas flow into the entire flow cross-section of the filter.

BRIEF DESCRIPTION OF THE DRAWINGS

For a better understanding of the present invention, reference should be had to the following detailed description taken in conjunction with the drawings, in which:

FIG. 1 is a transverse cross sectional view of a new and improved air bag inflator constructed in accordance with the features of the present invention;

FIG. 2 is a transverse cross-sectional view of another embodiment of a new and improved air bag inflator constructed in accordance with the features of the present invention;

DETAILED DESCRIPTION OF PREFERRED EMBODIMENTS OF THE INVENTION

Figure 3:
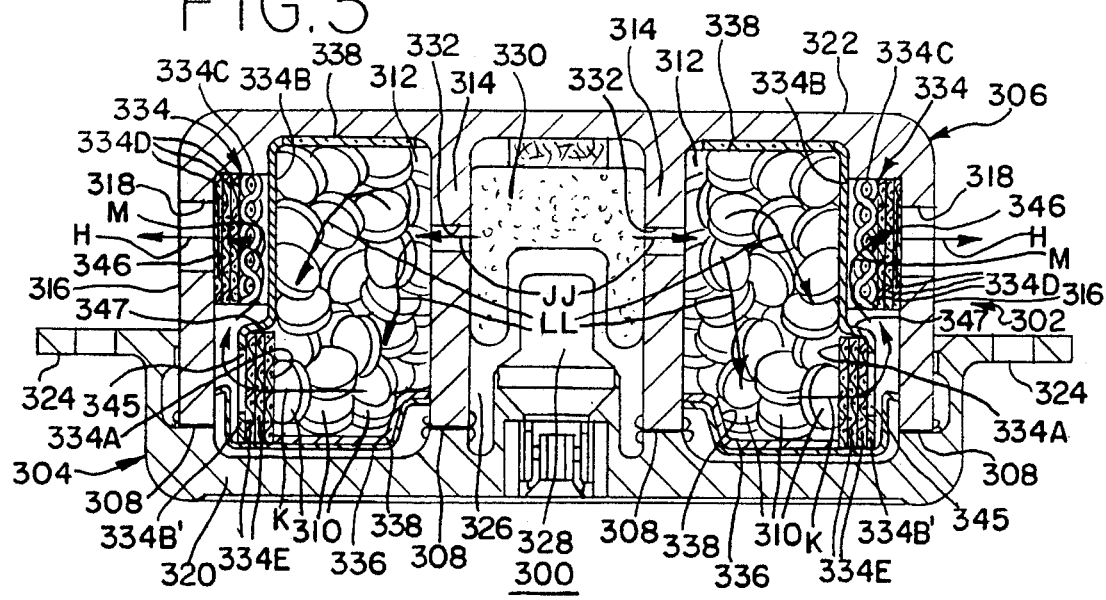
FIG. 3 is a transverse cross-sectional view of yet another embodiment of a new and improved air bag inflator constructed in accordance with the features of the present invention.

Referring now more particularly to FIG. 1 of the drawing, a new and improved air bag inflator 100 in accordance with the features of the present invention includes a metal housing or canister 102 formed with a lower base 104 and an upper cap or cover 106 joined together along a weld plane 108 by inertia welding to form an airtight enclosure for containing a selected quantity of solid, gas generating material such as sodium azide pellets or wafers 110. The generant 110 is contained in an annular, outer, combination combustion and filter containing chamber 112. The combination combustion and filter chamber 112 is formed between a centrally disposed, cylindrical, ignition chamber wall 114 and an outer, annular, cylindrical, side wall 116 having a plurality of circumferentially spaced apart diffuser ports 118 formed therein for directing generated gas from the inflator 100 outwardly to rapidly inflate an air bag (not shown) as indicated by the arrows A. The cylindrical outer side wall 116 and the concentric cylindrical ignition chamber wall 114 extend between a circular bottom wall 120 and a circular top wall 122 and an annular mounting flange 124 extends radially outwardly of the side wall 116 at a level below the ring of diffuser ports 118 for mounting the inflator 100 in a steering wheel hub (not shown).

The centrally disposed ignition chamber wall 114 defines a cylindrical ignition chamber 126 normally containing an electrically activatable ignition squib 128 and a charge of ignition enhancing material 130 such as BKNO$_3$ which is ignited by the squib 128 to cause hot ignition gases to flow rapidly outwardly through a plurality of circumferentially spaced apart ignition ports 132 formed in the ignition chamber wall 114. The ignition ports 132 slope downwardly and outwardly around the periphery of the ignition chamber wall 114 to direct the ignition enhancing gases from the ignition squib 128 and the enhancing material 130 outwardly to rapidly ignite the annular mass of gas generating pellets 110 contained in the annular, combination combustion and filter containing outer chamber 112 surrounding the ignition chamber 126 as indicated by the arrows B.

The hot ignition gases from the ignition enhancing material 130 and the squib 128 cause the gas generant 110 to rapidly ignite and rapidly develop a calculated quantity of hot, air bag inflation gas which flows outwardly into an annular filter 134 as indicated by the arrows C. The filter 134 entraps particulate from and cools the generated gas from the wafers 110 to protect an associated air bag from heat and contamination. The filter 134 is of an annular, generally cylindrical shape and is formed by a plurality of convolutions of screen mesh or other filter media wound in an annulus to completely surround the gas generant 110 and fill the space between the pellets and the outer wall 116 of the inflator housing 102.

Figure 4:
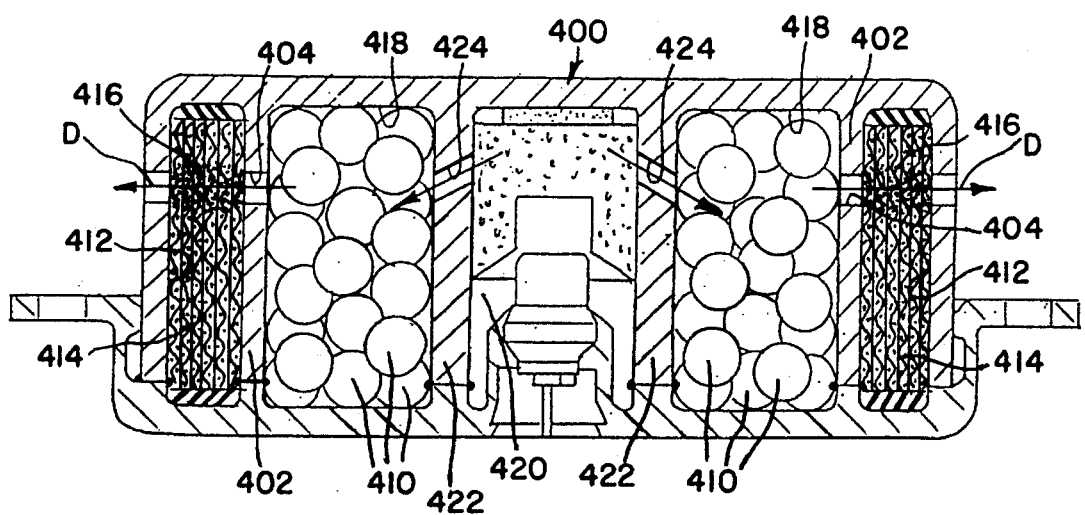
FIG. 4 is a transverse cross-sectional view of a typical triple chamber type prior art air bag inflator.

In accordance with the present invention, a cylindrically-shaped, relatively large gas inlet side or inner surface 134a of the filter 134 is in direct facing contact with the generant on an outer periphery of the annular mass of gas generant material 110. This is in contrast to a typical prior art inflator 400 as shown in FIG. 4, wherein a fixed metal combustion wall 402 having a ring of relatively small combustion ports 404 therein is interposed between an annular mass of gas generating pellets 410 and an outer annular filter containing chamber 412 which holds an annular filter element 414.

Prior art inflators 400 sometimes have a problem resulting from the relatively small flow cross-section of the combustion wall ports 404 which results in extremely high velocity gas flow through the wall ports causing holes or areas of burn through (arrows D and darkened areas 416) in the filter element 414. In addition, because the wall 402 occupies a considerable amount of space in the inflator 400 and because the gas flow from the gas generant material 410 must change directions rapidly in order to reach the ports 404, a great deal of efficiency is lost and overall, the inflator 400 must be larger in size to provide the same inflation characteristics as the smaller new and improved inflator 100 of the present invention.

Moreover, the prior art inflator 400 includes three (3) separate and distinct chambers 412, 418 and 420 separated by two (2) inside wall structures including an internal, centrally disposed inner side wall 422 having ignition ports 424 provided therein. An additional internal wall structure such as a combustion wall tends to make assembly of the inflator 400 a little more complex and difficult and a second internal, ported wall adds more cost. By eliminating a second internal combustion wall, the new and improved inflator 100 can be smaller in size, easier to manufacture and more efficient in operation with less chance of filter burn through and better utilization of the entire flow cross-section on the inlet side 134a of the filter 134.

In short, the absence of a ported combustion wall which acts as a barrier to the flow of generated gas into the filter 134 in the inflator 100 ensures that the flow of gas is more even and uniform across the entire and large size entry surface 134a of the filter 134, thus allowing a much lower average gas flow velocity, better filtering action and better cooling action even with a smaller volume filter and thus a smaller inflator size is possible overall. In order to facilitate production of the inflator 100, an aluminum retaining disk 136 is mounted to enclose the lower end of the annular mass of gas generating pellets 110 at a point free and clear of the welding joint plane 108. Also, a portion of an outer convolution 134b on the filter 134 is cut back to provide clearance space between the filter and the weld plane 108 of the outer wall 116. The outer diffuser ports 118 are sealed on the inside of the outer side wall 116 with an adhesively applied foil tape 138 to completely seal the welded housing 102 and protect against the entry of moisture and other contaminants during the lifetime of the inflator 100 before activation.

Referring now more particularly to FIG. 2 of the drawing, a new and improved air bag inflator 200 in accordance with the features of the present invention includes a metal housing or canister 202 formed with a lower base 204 and an upper cap or cover 206 joined together along a weld plane 208 by inertia welding to form an airtight enclosure for containing a selected quantity of solid, gas generating material such as sodium azide pellets or wafers 210. The generant 210 is contained in an annular, outer, combination combustion and filter containing chamber 212. The combination combustion and filter chamber 212 is formed between a centrally disposed, cylindrical, ignition chamber wall 214 and an outer, annular, cylindrical, side wall 216 having a plurality of circumferentially spaced apart diffuser ports 218 formed therein for directing generated gas from the inflator 200 outwardly to rapidly inflate an air bag (not shown) as indicated by the arrows E. The cylindrical outer side wall 216 and the concentric cylindrical ignition chamber wall 214 extend between a circular bottom wall 220 and a circular top wall 222 and an annular mounting flange 224 extends radially outwardly of the side wall 216 at a level below the ring of diffuser ports 218 for mounting the inflator 200 in a steering wheel hub (not shown).

The centrally disposed ignition chamber wall 214 defines a cylindrical ignition chamber 226 normally containing an electrically activatable ignition squib 228 and a charge of ignition enhancing material 230 such as BKNO$_3$ which is ignited by the squib 228 to cause hot ignition gases to flow rapidly outwardly through a plurality of circumferentially spaced apart ignition ports 232 formed in the ignition chamber wall 214. The ignition ports 232 extend radially outwardly around the periphery of the ignition chamber wall 214 to direct the ignition enhancing gases from the ignition squib 228 and the enhancing material 230 outwardly to rapidly ignite the annular volume of gas generating pellets 210 contained in the annular, combination combustion and filter containing outer chamber 212 surrounds the walled ignition chamber 226 as indicated by the arrows F.

The hot ignition gases from the ignition enhancing material 230 and the squib 228 cause the gas generant wafers 210 to rapidly ignite and rapidly develop a calculated quantity of hot, air bag inflation gas which flows outwardly into an annular filter 234 as indicated by the inner segments of the S-shaped arrows E. The filter 234 entraps contaminant material from and cools the generated gas from the generant 210 to protect an associated air bag from heat and contamination. The filter 234 is of an annular, generally cylindrical shape and is formed by a plurality of convolutions of screen mesh and/or other filter media completely surround the annular body of gas elements and is positioned to generating pellets 210. The new and improved filter 234 is dimensioned substantially to fill an outer space in the chamber 212 between the body of gas generant 210 and the outer wall 216 of the inflator housing 202.

In accordance with the present invention, the filter 234 has a cylindrically-shaped, relatively large gas inlet side or open mesh screen 234A forming a gas inlet side or inside annular surface of the filter in direct facing contact with the generant 210 on an outer periphery of the annular body of gas generant material.

Immediately outside and adjacent to the screen 234A there is provided a cylindrical shield or deflector 234B which blocks radial gas flow over about half of the total surface area of the screen 234A and deflects or turns the hot gases axially toward the bottom wall 220 as indicated by the arrows G. A plurality of open spaces or ports 245 are provided at the lower end portion of the impervious deflector 234B so that the hot gases can flow outwardly and upwardly through a relatively coarse cylindrical screen 234C and finally turn radially outwardly (arrows E) to move through a plurality of fine mesh outer screens 234D to reach the diffuser ports 218. An adhesively attached strip of foil 246 is provided on the inside surface of the outer wall 216 to seal off the housing 202 of the inflator 200 until the foil is perforated by the generation of hot gas from the gas generant material 210 upon air bag deployment. The outer fine mesh screens 234D are cylindrical in shape and extend downwardly from the top wall 222 to a mid-level in the housing 202 below the diffuser ports 218 and the screens are held in place by an upturned, outer portion 234B' of the annular flow deflector 234B.

As in the prior embodiment 100, the inflator 200 is provided with an annular aluminum disc 236 adjacent the bottom wall 220 and having upturned inner and outer edge flanges engaging the walls 214 and 216 respectively, for keeping the gas generating pellets 210 away from interference with the inertia welding process at the weld plane 208 during welding assembly of the base 204 and cover 206.

The innermost inlet screen 234A of the filter 234 receives a gas flow directly from the gas generating material 210 over the entire surface area so that the gas flow is at a relatively low velocity over a large flow cross-section. The flow deflector 234B deflects the gas flow axially toward the bottom wall 220 and the large ports 245 provide a large flow cross-section for the gas to flow outwardly into the large mesh screen 234C. By the time the gas reaches the lower level of the large mesh screen 234C most of the large particulate falls out and are collected at the bottom of the housing 202. The gas flow then moves upwardly and flows out the diffuser ports (arrows E) after screening and cooling takes place in the fine mesh outer screens 234D.

Finally, the inflator 200 may be provided with an annular damper pad 238 adjacent the top wall 222 and this pad acts to firmly hold the gas generate pellets 210 in a relatively tight cohesive body so that vibrations during the life of inflator 200 do not reduce the pellets to powder over a long period of time of vehicle use before air bag deployment is called for.

Referring now more particularly to FIG. 3 of the drawing, a new and improved air bag inflator 300 in accordance with the features of the present invention includes a metal housing or canister 302 formed with a lower base 304 and an upper cap or cover 306 joined together along a weld plane 308 by inertia welding to form an airtight enclosure for containing a selected quantity of solid, gas generating material such as sodium azide pellets or wafers 310. The generant 310 is contained in an annular, outer, combination, combustion and filter containing chamber 312. The combination combustion and filter chamber 312 is formed between a centrally disposed, cylindrical, ignition chamber wall 314 and an outer, annular, cylindrical, side wall 316 having a plurality of circumferentially spaced apart diffuser ports 318 formed therein for directing generated gas from the inflator 300 outwardly to rapidly inflate an air bag (not shown) as indicated by the arrows H. The cylindrical outer side wall 316 and the concentric cylindrical ignition chamber wall 314 extend between a circular bottom wall 320 and a circular top wall 322 and an annular mounting flange 324 extends radially outwardly of the side wall 316 at a level below the ring of diffuser ports 318 for mounting the inflator 300 in a steering wheel hub (not shown).

The centrally disposed ignition chamber wall 314 defines a cylindrical ignition chamber 326 normally containing an electrically activatable ignition squib 328 and a charge of ignition enhancing material 330 such as $BKNO_3$ which is ignited by the squib 328 to cause hot ignition gases to flow rapidly outwardly through a plurality of circumferentially spaced apart ignition ports 332 (arrows J) formed in the ignition chamber wall 314. The ignition ports 332 are directed radially outwardly around the periphery of the ignition chamber wall 314 to direct the ignition enhancing gases from the ignition squib 328 and the enhancing material 330 outwardly to rapidly ignite the annular mass of gas generating pellets 310 contained in the annular, combination combustion and filter containing outer chamber 312 surrounding the ignition chamber 326 as indicated by the arrows J.

The hot ignition gases from the ignition enhancing material 330 and the squib 328 cause the gas generant wafers 310 to rapidly ignite and rapidly develop a calculated quantity of hot, air bag inflation gas which flows outwardly into an annular filter 334 as indicated by the arrows K. The filter 334 entraps particulate from and cools the generated gas from the wafers 310 to protect an associated air bag from heat and hot particles. The filter 334 is of an annular, generally cylindrical shape and is formed by a plurality of convolutions of screen mesh or other filter media wound in an annulus to completely surround the gas generating pellets 310 and fill the space between the pellets and the outer wall 316 of the inflator housing 302.

In accordance with the present invention, the filter 334 has a cylindrically-shaped, relatively large gas inlet side or open mesh screen 334A forming a gas inlet side or inside annular surface of the filter in direct facing contact with the wafers or pellets 310 on an outer periphery of the annular body of gas generant material.

Immediately above and adjacent to the screen 334A there is provided a cylindrical shield or deflector 334B which blocks radial gas flow over about half of the total surface area of the screen 334A and deflects or turns the hot gases downwardly toward the bottom wall 320 as indicated by the arrows L. A plurality of open spaces or ports 345 are provided at the lower end portion of the impervious deflector 334B so that the hot gases can flow outwardly and upwardly through a relatively coarse cylindrical screen 334C (arrows K) and finally turn radially outwardly (arrows M) to move through a plurality of fine mesh outer screens 334D to reach the diffuser ports 318. An adhesively attached strip of foil 346 is provided on the inside surface of the outer wall 316 to seal off the housing 302 of the inflator 300 until the foil is perforated by the generation of hot gas from the gas generant material 310 upon air bag deployment. The outer fine mesh screens 334D are cylindrical in shape and extend downwardly from the top wall 322 to a mid-level in the housing 302 below the diffuser ports 318 and the screens 334C and 334D are maintained in place in an upper portion of the chamber 312 at the outer edge portion by an outwardly extending annular flange portion 347 of the annular flow deflector 334B. Below the flange 347, a ported lower end portion 334B' of the deflector 334B of cylindrical shape is offset outwardly to accommodate a plurality of fine mesh inlet screens 334E.

As in the prior embodiments 100 and 200, the inflator 300 is provided with an annular aluminum disc 336 adjacent the bottom wall 320 and having upturned inner and outer edge flanges engaging the walls 314 and 316 respectively, for keeping the gas generating pellets 310 away from interference with the inertia welding process at the weld plane 308 during welding assembly of the base 304 and cover 306.

The innermost inlet screen 334A and the fine mesh inlet screens 334E of the filter 334 receive gas flow directly from the gas generating pellets 310 over the entire surface area so that the gas flow is at a relatively low velocity over a relatively large flow cross-section. The flow deflector 334B deflects the gas flow downwardly toward the bottom wall 320 and the large ports 345 provide a large flow cross-section for the gas to flow outwardly into the large mesh screen 334C. By the time the gas reaches the lower level of the large mesh screen 334C most of the large particulates fall out and are collected at the bottom of the housing 302. The gas flow then moves upwardly (arrows K and M) and flows out the diffuser ports 318 (arrows H) after screening and cooling takes place in the fine mesh outer screens 334D. The inlet screens 334A and 334B also provide cooling and filter out the larger particulates in the gas.

The inflator 300 may be provided with a pair of resilient, annular damper pads 338 adjacent the top wall 322 and the bottom wall 320 and these pads act to firmly hold the gas generate pellets 310 in a relatively tight cohesive body so that vibrations during the life of inflator 300 do not reduce the pellets to powder over a long period of time of vehicle use before air bag deployment is called for.

Figure 5:
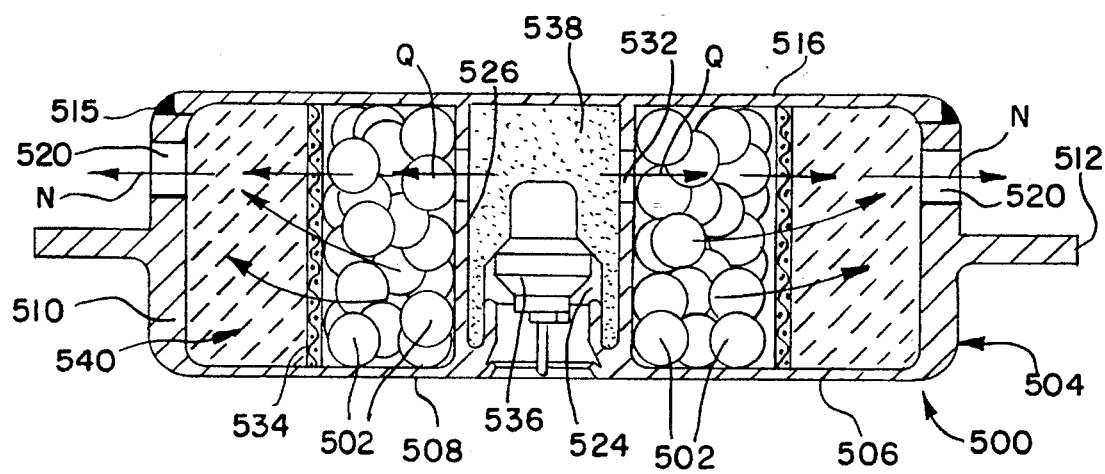
FIG. 5 is a transverse cross-sectional view of still another embodiment of a new and improved air bag inflator constructed in accordance with the features of the present invention.
Figure 6:
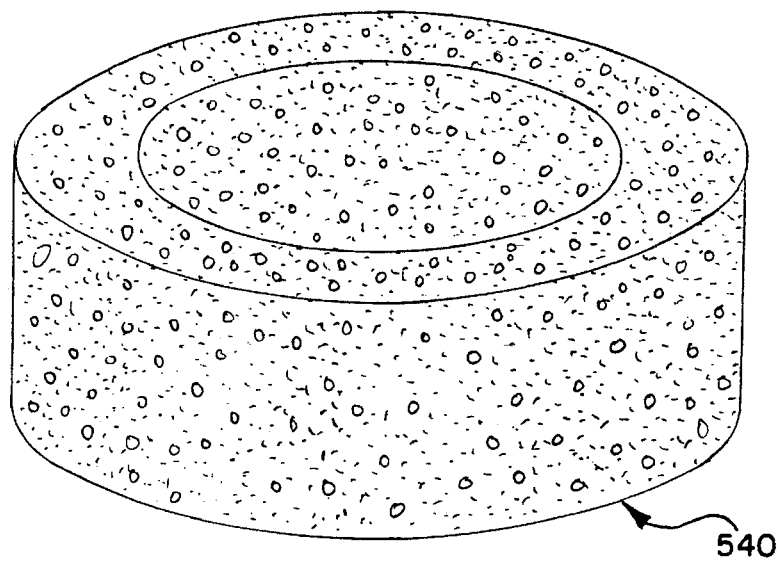
FIG. 6 is a perspective view of a unitary, rigid, drop-in type, porous filter that is utilized in the inflator of FIG. 5 capable of withstanding higher temperatures that may obtain when non-azide type gas generant material is used.

Referring now to FIGS. 5 and 6, therein is illustrated another embodiment of a driver's side, generally cylindrical-shaped air bag inflator 500 also especially designed and adapted to utilize non-azide type gas generating material such as mixtures of copper oxide and amino tetrazol in solid form such as the granules or tablets 502.

The air bag inflator 500 includes a cylindrical housing or canister 504 for holding a predetermined quantity of gas generating material 502 and the canister includes a lower, cup-shaped base 506 having a circular bottom wall 508 and an upstanding cylindrical side wall 510 formed of metal or steel alloy which is exceptionally strong, light-in-weight, and relatively resistant to corrosion and unwanted chemical activity. Adjacent an intermediate level on the side wall 510, the base 506 is provided with an outwardly projecting annular flange 512 for mounting the inflator 500 in the hub portion of a vehicle steering wheel (not shown).

The housing includes an upper cover or circular top wall 516 joined to the upper end of the cylindrical side wall 510 of the base 506 by welding, crimping or other means 515. Above the mounting flange 512, a side wall 510 is formed with a plurality of gas discharging, diffuser ports 520 circumferentially spaced apart around the wall in a ring to discharge the gas generated for inflating an associated air bag (not shown) as indicated by the arrows N.

After internal components of inflator 500 have been positioned inside the housing or canister 504, the base 506 and the cover 516 are permanently joined together as by welding to form a sealed protective enclosure for the gas generant material 502 and other internal components.

The canister 504 includes a centrally disposed ignition chamber 524 formed by coaxially aligned cylindrical wall 526 projecting upwardly of the bottom wall 508 of the base 506 and joined to the cover 516. The inner wall 526 is formed with a plurality of circumferentially spaced apart, ignition gas ports 532 for directing hot ignition gases into the primary non-azide type gas generating material 502 contained in an annular, main combustion chamber 534 surrounding the central ignition chamber 524 as indicated by arrows Q. The inner wall 526 is provided with a ring of circumferentially spaced apart, ignition ports 532 for directing ignition gas radially outwardly toward an annular, main combustion chamber 534 surrounding the central ignition chamber 524.

The central ignition chamber 524 contains an igniter squib 536 adapted to be electrically activated to ignite when the air bag is to be rapidly inflated. The squib 536 in turn causes a charge of ignition enhancer material 538 also contained in the ignition chamber 524 to rapidly ignite and discharge hot ignition gases directly out the ports 532 for rapidly igniting the gas generating material 502.

In order to filter out and entrap solids and other contaminants from the hot gases generated from the combustion of the non-azide gas generant material 502, the ignition squib 536 and the ignition enhancing charge 538, the inflator 500 is provided with a new and improved drop-in type, annular, cylindrically-shaped filter 540 mounted in the outer portion of the combustion chamber 534 surrounding the gas generant material 502.

The new and improved, unitary, annular filter 540 is constructed of strong, rigid, porous, material that provides a plurality of tortuous passages for entrapping contaminants from the generated gas and for cooling the gas by absorbing heat therefrom. In general, the porous, rigid, strong, filter 540 may have a porosity rating in pores per inch ranging from 20 to 65 ppi. It has been found that the filter formed in the manner herein described and of the materials herein described has excellent gas filtering and gas cooling characteristics and is well able to withstand the more corrosive and chemically active types of non-azide type gas generating materials 502 as well as the higher temperatures and pressures that accompany the rapid ignition of these materials.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An air bag inflator designed for the rapid generation of gas when activated for inflating an air bag associated therewith, comprising:

a housing having an outer peripheral side wall with a plurality of spaced apart diffuser ports therein for directing gas outwardly to inflate said air bag;

said housing including a top wall and a spaced apart bottom wall joined respectively to opposite end portions of said outer peripheral side wall and a single, inner side wall extending between and joined to said top and bottom wall within said outer peripheral side wall and including a plurality of spaced apart ignition ports therein for directing hot ignition gas outwardly toward said outer peripheral side wall;

ignition means in a first ignition chamber defined within said inner side wall for generating hot ignition gases to flow out said ignition ports; and a second chamber around said inner side wall containing gas generating material adapted to be ignited by said ignition gas for generating gas to inflate said air bag and filter means for entrapping solid contaminants from said gas flowing outwardly of said gas generating material toward said diffuser ports, said filter means extending around said gas generating material between said top and bottom walls and having an inner periphery in direct contact with said gas generating material and an outer periphery adjacent an inside surface of said peripheral side wall.

2. The air bag inflator of claim 1, wherein:
   said first and second chambers are separated by said inner side wall.

3. The air bag inflator of claim 2, wherein:
   said first and second chambers are cylindrical in shape and are in coaxial alignment.

4. The air bag inflator of claim 1, wherein:
   said second chamber is annular in shape and includes an inner portion for containing an annular-shaped body of said gas generating material and an outer portion of annular shape for holding said filter means.

5. The air bag inflator of claim 4, wherein:
   said filter means is annular in shape and substantially fills said outer portion of said second chamber.

6. The air bag inflator of claim 1, wherein:
   said inner periphery of said filter means is cylindrical in shape and in direct contact with an outer periphery of said gas generating material.

7. The air bag inflator of claim 6, wherein:
   said filter means includes a first portion adjacent said outer periphery of said gas generating material for entrapping particulates from said gas and in direct contact therewith a second portion outwardly surrounding said first portion for filtering and cooling said gas.

8. The air bag inflator of claim 7, wherein:
   said first portion includes a cylindrical screen of open mesh and said second portion includes a cylindrical screen of finer mesh than said first portion.

9. The air bag inflator of claim 8, including:
   flow deflector means between said first and second portions of said filter means for deflecting said gas to flow downward toward said bottom wall.

10. The airbag inflator of claim 1, wherein:
    said single, inner side wall is integral with said top and bottom walls.

11. An inflator for generating gas when activated to inflate an air bag, comprising;

a housing having a centrally disposed ignition chamber for holding ignition materials;

an outer chamber in coaxial relation around said ignition chamber for containing gas generating material and a filter;

said housing including an outer wall having a plurality of spaced apart diffuser ports for directing gas generated by said inflator outwardly to inflate said air bag and a single inner wall around said ignition chamber having a plurality of ports to direct hot ignition gases outwardly of said ignition chamber to ignite said gas generating material in said outer chamber;

said housing further including spaced apart top and bottom walls joining opposite ends of said inner and outer walls to close said chambers; and annular filter means mounted in said outer chamber in direct contact with and surrounding said gas generating material for entrapping solid contaminants from said gas and cooling said gas flowing outwardly toward said diffuser ports.

12. The inflator of claim 11, wherein:
    said ignition chamber and said outer chamber are separated by said inner wall.

13. The inflator of claim 12, wherein:
    said ignition chamber and said outer chamber are cylindrical in shape and are in coaxial alignment.

14. The inflator of claim 11, wherein:
    said outer chamber is annular in shape and includes an inner portion for containing an annular-shaped body of said gas generating material and an outer portion of annular shape for holding said annular filter means.

15. The inflator of claim 14, wherein:
    said annular filter means substantially fills said outer portion of said outer chamber.

16. The inflator of claim 11, wherein:
    an inner periphery of said filter means is cylindrical in shape and in direct contact with an outer periphery of said gas generating material.

17. The inflator of claim 16, wherein:
    said filter means includes a first portion adjacent said outer periphery of said gas generating material for cooling and entrapping particulates from said gas and in direct contact therewith a second portion outwardly surrounding said first portion for filtering and cooling said gas.

18. The inflator of claim 17, wherein:
    said first portion includes a plurality of open mesh cylindrical screens and said second portion includes a plurality of cylindrical screens of coarse and finer mesh.

19. The inflator of claim 18, including:
    flow deflector means between said first and second portions of said filter means for deflecting said gas to flow downward toward said bottom wall.

20. The airbag inflator of claim 11, wherein:
    said single inner wall is integral with said top and bottom walls.

* * * * *

REEXAMINATION CERTIFICATE (3643rd)

United States Patent [19]
Parker et al.

[11] B1 5,466,420
[45] Certificate Issued Oct. 6, 1998

[54] AIR BAG INFLATOR

[75] Inventors: Todd S. Parker, Centerville; Brian T. Snyder, Hooper; Brian H. Fulmer, Farr West, all of Utah

[73] Assignee: Morton International, Inc., Chicago, Ill.

Reexamination Request:
No. 90/004,707, Jul. 11, 1997

Reexamination Certificate for:
Patent No.: 5,466,420
Issued: Nov. 14, 1995
Appl. No.: 280,486
Filed: Jul. 26, 1994

[51] Int. Cl.⁶ ........................................ B60R 21/16
[52] U.S. Cl. .................. 422/164; 422/165; 280/736; 280/740; 280/742
[58] Field of Search ........................ 422/164, 165, 422/166, 167, 305; 280/736, 740, 742

[56] References Cited

U.S. PATENT DOCUMENTS 4,902,036  2/1990  Zander et al. .

FOREIGN PATENT DOCUMENTS

0589042A1  12/1992  European Pat. Off. .

*Primary Examiner*—Timothy McMahon

[57] ABSTRACT

An air bag inflator for inflating an air bag includes a housing for generating gas having only two walled chambers, including a centrally disposed ignition chamber and an outer chamber in coaxial relation therewith. The outer chamber provides a dual function of containing a quantity of gas generating material in an inner portion thereof and holding a filter for cooling and collecting contaminants from the generated gas in an outer portion thereof. The filter is mounted with an inlet face of substantial area in direct contact with and surrounding a body of gas generating material and no wall is provided between the filter and the generating material.

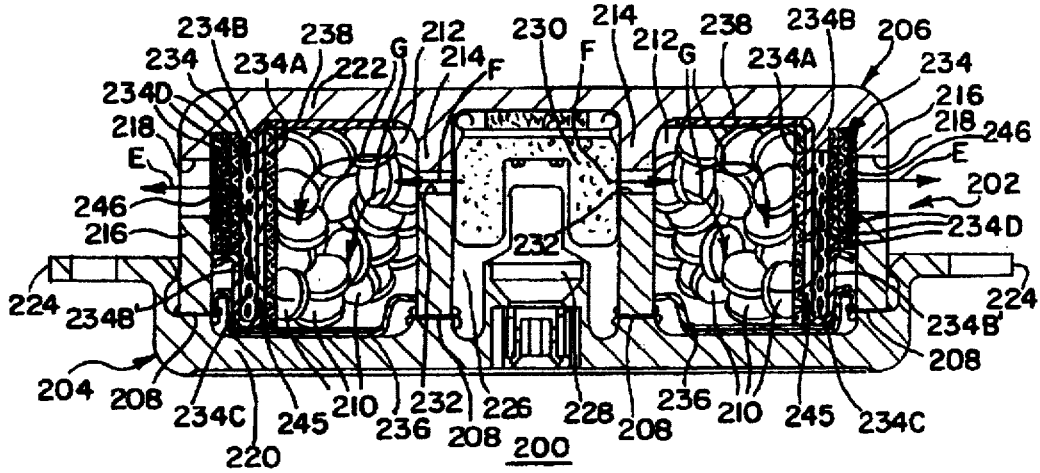

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

* * * * *